United States Patent [19]

Wallace et al.

[11] Patent Number: 4,706,556
[45] Date of Patent: Nov. 17, 1987

[54] POTATO CHIP MANUFACTURING MACHINE

[75] Inventors: Joseph E. Wallace; Robert L. Shaffer, both of Creston, Iowa

[73] Assignee: Vanmark Corporation, Creston, Iowa

[21] Appl. No.: 818,609

[22] Filed: Jan. 13, 1986

[51] Int. Cl.[4] .......................................... A47J 37/12
[52] U.S. Cl. .................................. 99/330; 99/353; 99/404; 99/407; 99/408
[58] Field of Search ............... 426/523; 99/404, 407, 99/408, 405, 406, 352, 353, 357, 536, 330; 15/3.1, 3.12; 126/39 R

[56] References Cited

U.S. PATENT DOCUMENTS

| | | | |
|---|---|---|---|
| 1,086,248 | 2/1914 | Varian | 99/406 |
| 1,520,860 | 12/1924 | Denz | 99/353 |
| 1,629,355 | 5/1927 | Morrow | 99/353 |
| 1,674,555 | 6/1928 | Leone | 99/404 X |
| 2,538,937 | 1/1951 | Foster | 99/353 X |
| 2,886,439 | 5/1959 | Eytinge | 99/353 X |
| 3,154,187 | 10/1964 | Roth | 99/404 X |
| 3,635,149 | 1/1972 | Smith | 99/404 |
| 3,744,475 | 7/1973 | Myler | 99/407 X |
| 3,949,443 | 4/1976 | Edgar | 15/3.12 X |
| 4,488,478 | 12/1984 | Leeper | 99/353 X |

FOREIGN PATENT DOCUMENTS 1069766  1/1984  U.S.S.R. ............................... 99/536

Primary Examiner—Timothy F. Simone
Attorney, Agent, or Firm—Zarley McKee, Thomte, Voorhees & Sease

[57] ABSTRACT

A potato chip manufacturing machine comprising a frame, an elongated oil cooking kettle mounted on the frame, and an oil circulation circuit connected to the oil for causing flow of cooking oil in a longitudinal direction through the cooking kettle. Flow retarding paddles are horizontally mounted in a transverse direction over the oil in the kettle and are adapted to retard the flow of potato slices longitudinally in the kettle. A powered conveyor device is mounted on one end of the kettle to remove cooked potato slices from the oil. A potato slicing means is pivotally mounted on one end of the frame. The potato slicing means, the paddle and the conveyor are powered by variable speed motors. Either a gas or electrical heat means is provided over the kettle to heat the oil therein. Elongated, spaced apart heat exchanger bars are located on the bottom of the kettle. The vanes of the retarding paddles are sand blasted and bent slightly to prevent adhesion by potato slices. A potato washing device is mounted on the frame adjacent the potato slicing means.

9 Claims, 9 Drawing Figures

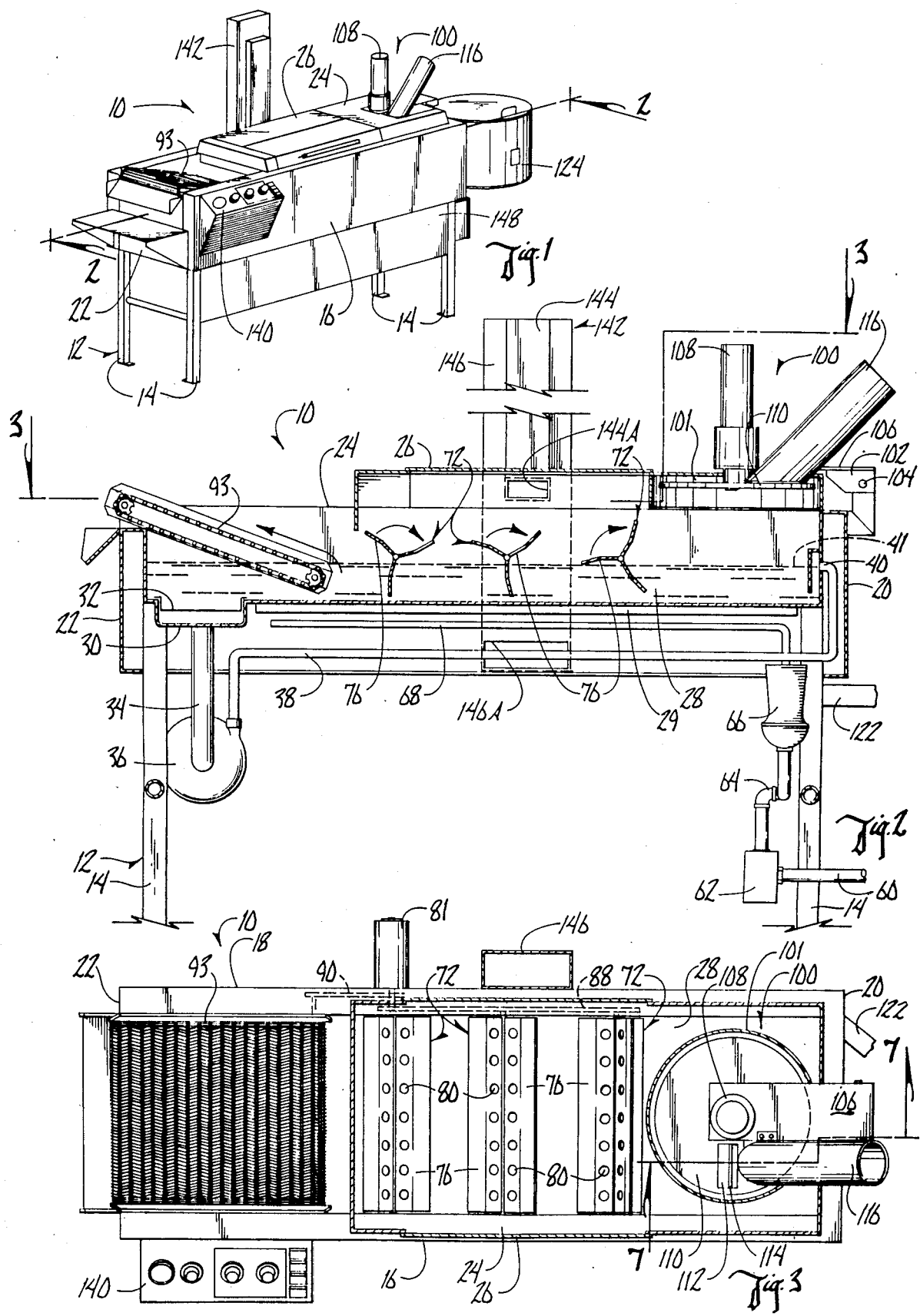

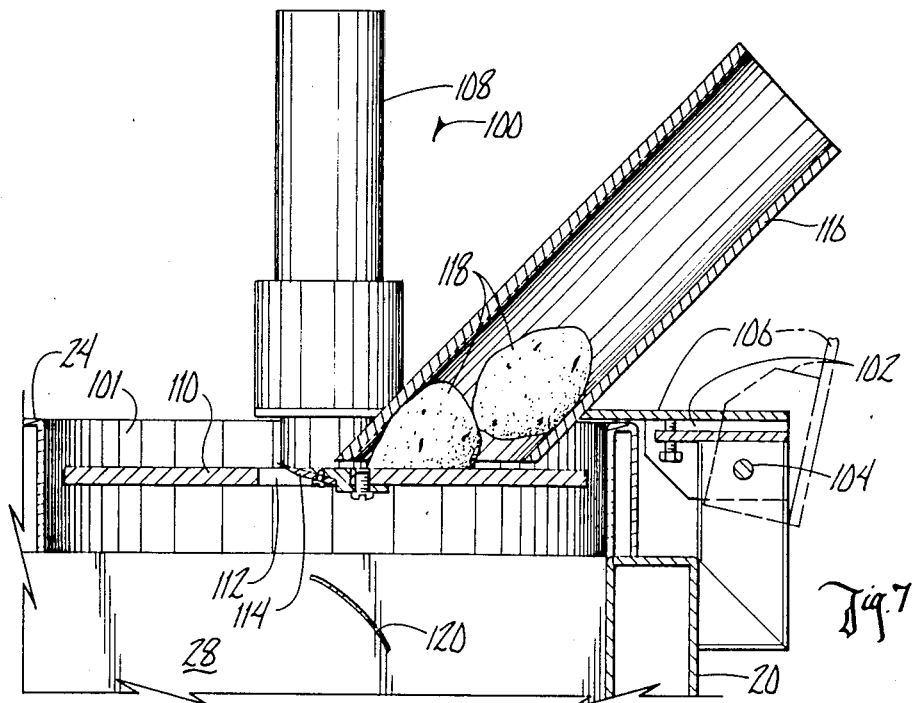
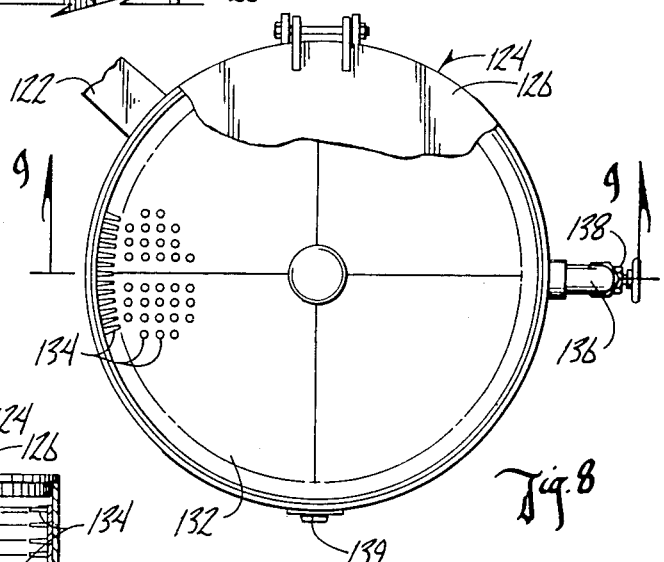
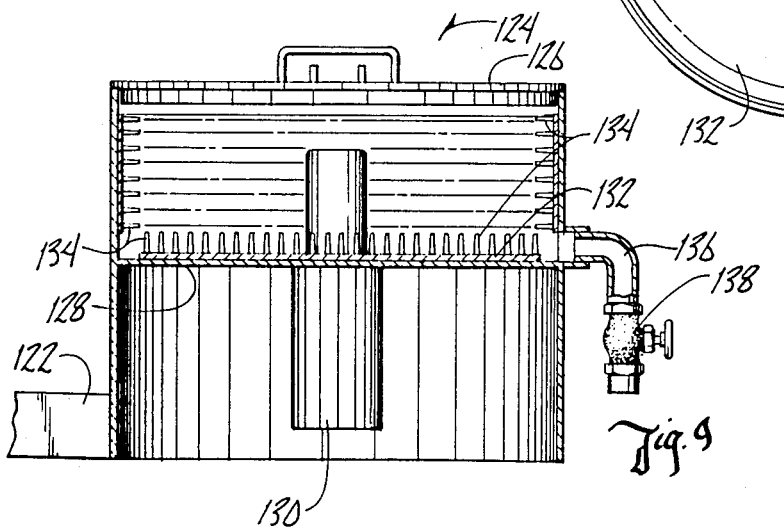

POTATO CHIP MANUFACTURING MACHINE

BACKGROUND OF THE INVENTION

Packaged potato chips as generally available in grocery stores and the like are mass produced through the utilization of substantially large machinery. An attempt has been made to provide a potato chip manufacturing machine on a smaller scale to provide freshly made potato chips to the consumer in fast food environments.

The device of this invention is an improvement over such a small scale machine. This device of the prior art comprised a frame which supported an elongated oil cooking kettle which was heated by a gas burner. The oil was circulated longitudinally through the kettle by a pump device. Flow retarding paddles were horizontally mounted transverse of the direction of flow of oil in the kettle to retard the flow of potato slices longitudinally in the kettle.

A powered conveyor device was located at one end of the kettle to remove the cooked potato slices from the oil.

A potato slicing means was mounted on the frame partially above the end of the kettle opposite to the conveyor.

The above prior art device had several shortcomings. First of all, it had no potato washing station on the machine which added to the inconvenience of the use thereof. The retarder paddles and the conveyor were driven at constant speeds which added inconvenience to the operator as the volume of potato slices through the unit was varied.

The unit was heated by gas heat and the transfer of heat uniformly to the kettle from the gas burners was inefficient.

The potato slicing device was not completely mounted over the kettle, which caused some potato slices to accumulate on the slicing mechanism without dropping into the cooking oil.

The retarding paddles of this prior art device did not function well to release the potato slices in the cooking oil and as a result, the potato slices often adhered to the paddles.

In addition, this prior art device caused the operator to be substantially exposed to the heat of the gas burners, which made continuous operation of the machine very uncomfortable to the operator.

SUMMARY OF THE INVENTION

The device of this invention comprises substantially the same basic components of the above-described prior art machine, but includes substantial refinements thereover which contribute to the efficient and improved operation of the potato chip manufacturing process.

The device of this invention provides for either gas or electric heat, and heat transfer bars are added to the bottom of the kettle to enhance the heat transfer phenomenon in the gas-operated device.

Further, the device of this invention employs D.C. variable speed motors for both the potato slicer and the retarder paddles and conveyor so that the speed of these respective elements can be carefully coordinated with the volume of potatoes being processed.

The device of this invention includes a heat shield adjacent one side of the machine to protect the operator from the radiant heat of particularly the gas-operated machine.

A potato washing station has been added to the machine of this invention to facilitate the total potato chip manufacturing operation.

The shape and finish of the flow retarding paddles has been modified to enhance the release of the sliced potatoes by the paddles.

The location of the slicing station has been moved so that it dwells completely over a portion of the kettle so that all potato slices will drop into the kettle regardless of the point at which they are dropped by the slicing means. Further, the potato slicing station is pivotally mounted to the frame of the machine so that it can be tilted to an upward inoperative position for cleaning purposes.

The foregoing features of this invention greatly facilitate and expedite the potato chip manufacturing process with respect to the prior art machine from which it was derived.

BRIEF DESCRIPTION OF THE DRAWINGS

FIG. 1 is a frontal perspective view of the potato chip manufacturing machine of this invention;

FIG. 2 is a longitudinal sectional view thereof shown at an enlarged scale and taken on line 2—2 of FIG. 1;

FIG. 3 is a partial plan view that is taken on line 3—3 of FIG. 2;

FIG. 7 is a sectional view at an enlarged scale taken on line 7—7 of FIG. 3 and showing the details of the potato slicing mechanism;

FIG. 8 is a plan view of the potato washer mechanism with a portion of the cover thereof cut away to more fully illustrate its construction; and FIG. 9 is a sectional view of the potato washer as seen on line 9—9 of FIG. 8.

DESCRIPTION OF THE PREFERRED EMBODIMENT

Figure 4:
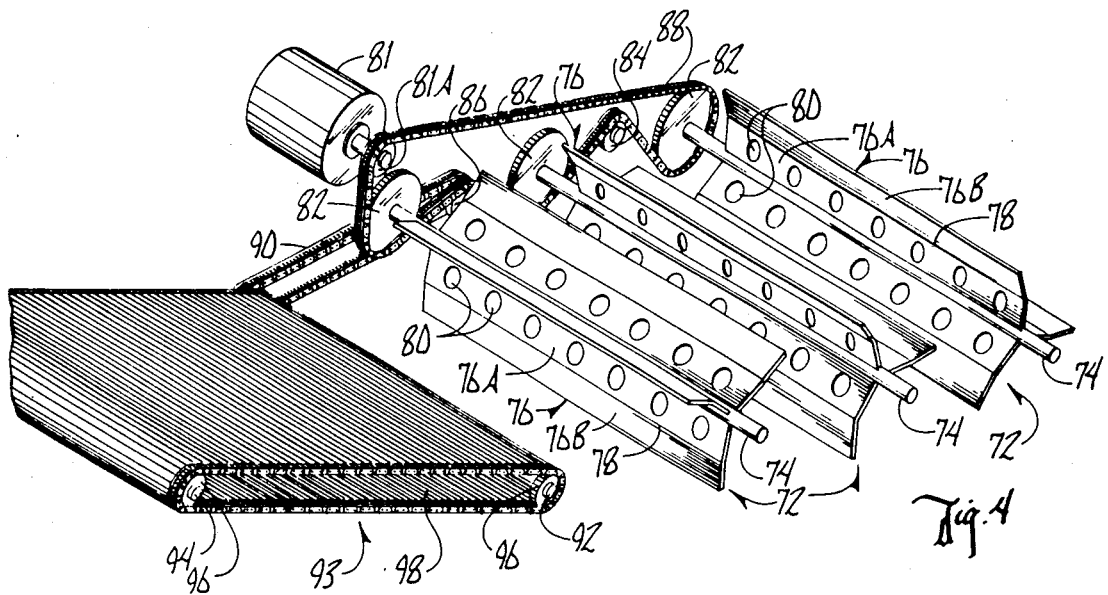
FIG. 4 is a partial perspective view of the power train of the retarder paddles and the conveyor shown at an enlarged scale.

The numeral 10 designates the potato chip manufacturing machine of this invention and is best shown in its entirety in the perspective view of FIG. 1. The machine 10 includes a frame 12 which is supported on four vertical legs 14. A vertically disposed front panel 16 is secured to frame 12 as is a vertically disposed rear panel 18 (FIG. 3). End panels 20 and 22 enclose the end of frame 12 and top panel 24 extends over the top portion of the frame. A cover 26 is pivotally secured to top panel 24 by any convenient means to provide visual and physical access to the elongated kettle 28 which is secured to the upper portion of frame 12.

Kettle 28 has a plurality of elongated, spaced apart heat exchanger bars 29 secured to the lower portion thereof. These bars can either be integral with the kettle 28 or can be welded or otherwise fastened thereto. A sump 30 is located at one end of kettle 28 and a removable strainer 32 is mounted over the sup 30 as best shown in FIG. 2.

The device shown in FIGS. 1 through 3 is heated by combustible gas. A pipe 34 extends downwardly from sump 30 and is operatively connected to oil pump 36. A pipe 38 extends from pump 36 and terminates at a discharge port 40 located at the end of kettle 28 opposite to the location of pump 36.

Figure 6:
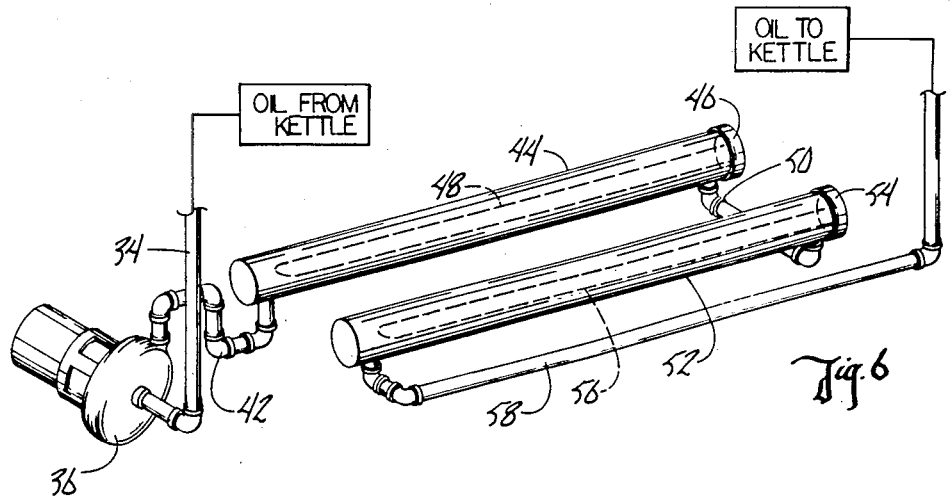
FIG. 6 is an alternate electrical heating mechanism adaptable to the structure of FIGS. 1-3.

Alternatively, the oil 41 can be electrically heated by the apparatus best shown in FIG. 6. A pipe 42 extends from pump 36 and is in communication with one end of pipe 44 which is larger in diameter. A cap 46 is threadably secured to the end of the pipe 44 opposite to the point of connection between pipes 42 and 44, and an electrical heating element 48 shown in dotted lines in FIG. 6 is operatively supported by cap 46. Heating element 48 is secured to a source of electrical power (not shown).

Pipe 50 interconnects one end of pipe 44 with pipe 52. Pipe 52 has a cap 54 threadably mounted on one end thereof with heating element 56 extending therefrom into the cap 54. Heating element 56 is also secured to a source of electrical energy (not shown). Pipe 58 is connected to the end of pipe 52 opposite to cap 54, and is in communication with the end of the kettle 28 opposite to the pump 36 and terminates in a discharge port identical to discharge port 40. (See FIG. 2).

Figure 5:
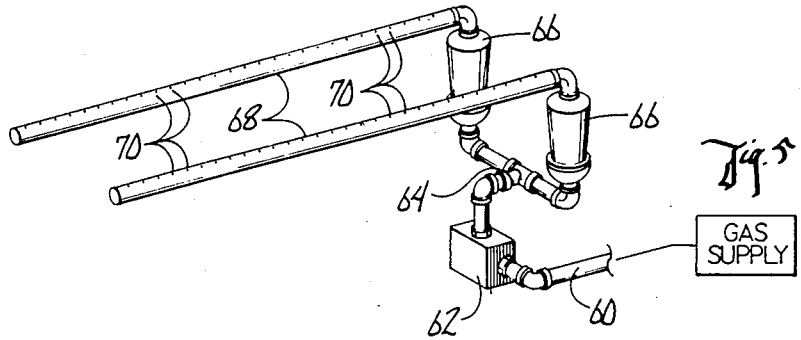
FIG. 5 is a perspective view of the gas burner mechanism shown in FIG. 2.

The gas burner arrangement shown on the machine of FIG. 2 is more clearly shown in the perspective view of FIG. 5. A gas supply line 60 is connected to a conventional thermostat 62 which in turn is connected to a T-pipe 64. Conventional pilot lights 66 are connected to the T-pipe 64 and are connected to horizontally extending burner pipes 68 which extend the full length of kettle 28. Conventional apertures 70 are located in burner pipe 68 to emit the combusting gas.

As best shown in FIGS. 2-4, a plurality of flow retarder paddles 72 are transversely mounted across kettle 28. The paddles are supported on horizontal shafts 74 which are rotatably mounted on suitable bearings (not shown) on the sides of frame 12. A plurality of vanes 76 extend radially outwardly from shafts 74. Vanes 76 are comprised of a first vane segment 76A which extends radially outwardly from shaft 74, and a vane segment 76B which is bent at a slight angle with respect to vane segment 76A along bend line 78. Apertures 80 (FIG. 4) are located in at least vane segments 76A. The vanes 76 are normally comprised of sand blasted metal which, along with the bent configuration of the vanes, enhances their ability to release and not accumulate potato slices in the cooking operation. With reference to FIG. 2, it will be noted that the shafts 74 are normally located slightly above the level of oil 41.

With reference to FIG. 4, motor 81 is mounted by any convenient means on frame 12 and has sprocket 81A mounted on its output shaft. Each of the shafts 74 have a larger sprocket 82 mounted on one end thereof. Idler sprockets 84 and 86 are rotatably mounted on rear panel 18. A chain 88 extends around sprockets 81A, 82 and 84 to effect the uniform rotation of the flow retarder paddles 72. Sprocket 86 is a compound sprocket and accommodates not only chain 88 but also chain 90. Chain 90 connects sprocket 86 and a sprocket (not shown) on shaft 92 which is rotatably mounted between front and rear panels 16 and 18, respectively. Shaft 92 rotatably supports conveyor means 93 which includes a shaft 94 which is positioned parallel to shaft 92. Each of the shafts 92 and 94 have sprockets 96 on at least one end thereof over which conveyor belt 98 extends. Conveyor belt 98 can be of metallic or other construction, but should have suitable apertures to permit oil from cooked potato slices to drop downwardly therefrom. Rotation of shaft 92 through chain 90, sprocket 86, and through the rotation of chain 88 causes the conveyor belt 98 to rotate in the direction of the arrow shown in FIG. 2.

The potato slicing station 100 of FIG. 1 is shown in detail in FIG. 7. The station 100 is mounted in well 101 in top panel 24. The station is comprised of a bracket 102 which is pivotally secured to frame 12 by hinge 104. A horizontal plate 106 is rigidly secured to hinge 104 and supports motor 108. Horziontal turntable 110 is secured to the output shaft of motor 108. Turntable 110 has a slot opening 112 with a slicing knife 114 mounted therein.

An inclined feed tube 116 with upper and lower open ends is rigidly secured to plate 106. Potatoes 118 deposited in the upper end of tube 116 ultimately rest on turntable 110. As the turntable 110 rotates, knife 114 intermittently comes in contact with the bottommost portion of the potato and sequentially slices a portion from the potato to create potato slice 120. Potato slice 120 may drop from any portion of turntable 110 and fall directly into the oil 41 since the entire turntable 110 is located over the oil 41.

A horizontal arm 122 is secured to one end of frame 12 and supports washer drum 124 which is best shown in FIGS. 8 and 9. A cover 126 is pivotally secured to the top of drum 124. A false bottom 128 is horizontally positioned within drum 124 and supports motor 130. A turntable 132 is rotatably mounted on the output shaft of motor 130 and is positioned adjacent the upper surface of false bottom 128. A material comprised of resilient fingers 134 is located on the upper surface of turntable 132 as well as on the interior surface of washer drum 124 at a level above turntable 132. A drain pipe 136 extends into drum 124 at the level of turntable 132. A fluid control valve 138 is conventionally imposed in pipe 136. A motor control 139 which may also include a timing mechanism is conventionally and operatively connected to motor 130.

A control panel 140 is imposed on front panel 16 and is operatively connected to motor 108 on slicing station 100; motor pump 36; and motor 81. The conventional electrical components (not shown) of control panel 140 are such that the operator can vary the speed of motors 81 and 108 to accommodate variations in the volume of potatoes and potato slices being processed.

A vertical hollow stack 142 comprising a steam conduit 144 and a combustion gas conduit 146 is secured to the rearward portion of frame 12. Steam conduit 144 has a port 144A (FIG. 2) which is in communication with the upper portion of kettle 28. Steam conduit 144 serves to provide a discharge for steam created when potato slices are being cooked in kettle 28. Combustion conduit 146 has a port 146A which is in communication with the portion of the machine underneath the kettle 28. Combustion conduit 146 serves to convey away from the machine the products of combustion when the gas unit shown in FIG. 5 is utilized.

A heat shield panel 148 is mounted across the frame 12 below front panel 16 to protect the legs of the operator from radiant heat, particularly when the gas heating unit of FIG. 5 is utilized on the machine.

In the operation of the machine, a small amount of water is placed within washer drum 124 and the unclean potatoes are placed in the washer drum on turntable 132. The motor 130 is started and the potatoes are tumbled within the washer drum. The action of the resilient fingers 134 on the turntable and on the interior sides of the drum serves to clean the potatoes.

The potatoes are then individually removed from the washer drum and deposited in the upper end of the inclined tube 116 of the potato slicing station 100. The potatoes are then sliced in the manner described heretofore, and the potato slices 120 are dropped immediately into the oil 41 of kettle 28.

The potato slicing station 100 can be tilted as partially shown by the dotted lines in FIG. 7 to permit the potato slicing station to be cleaned when the machine is not in use. Since the potato slicing station is completely located over the oil-filled kettle 28, all of the potato slices exiting the turntable 110 will be dropped immediately into the oil.

The pump 36 causes the oil to flow horizontally in a left-hand direction as seen in FIG. 2. The flow retarder paddles 72 slow down the flow of potato slices through the kettle. It has been found that the bend in the vanes 76 as previously described facilitates the release of the potato slices from the vanes.

The potato slices float essentially on the surface of the oil 41, and ultimately move to the conveyor belt 98 where they move upwardly and are then dropped into a suitable receptacle. The speed of the paddles 72 and the conveyor belt 98 can be adjusted to accommodate variations in the volume of the potato slices being processed.

It is thus seen that the device of this invention will accomplish at least is stated objectives.

We claim:

1. In a machine for manufacturing potato chips, said machine comprising, a frame, an elongated cooking oil container on said frame, a potato slicing means secured to the upper portion of a first end of said container, fluid flow means operatively connected to said cooking oil container to cause cooking oil to flow in said container from said first end toward a second end of said container, a potato chip discharge means mounted on said second end of said container, and heating means on said frame to heat oil in said container to cook potato slices deposited therein; the improvement comprising, heat tranfer means on the exterior bottom of said container adjacent said heating means to enhance the uniform conduction of heat from said heating means to said container, said heat transfer means comprising a plurality of spaced apart solid bars adjacent the entire bottom of said container.

2. In a machine for manufacturig potato chips, said machine comprising, a frame, an elongated cooking oil container on said frame, a potato slicing means secured to the upper portion of a first end of said container, fluid flow means operatively connected to said cooking oil container to cause cooking oil to flow in said container from said first end toward a second end of said continer, a potato chip discharge means mounted on said second end of said container, and heating means on said frame to heat oil in said container to cook potato slices deposited therein; the improvement comprising, a potato washing means mounted on said frame adjacent said potato slicing means, said potato washing machine comprising a cylindrical container having a stationary vertical cylindrical wall, a powered rotatable turntable in said container, and a covering material on the inner surface of said cylindrical wall and on said turntable including a plurality of protruding resilient fingers.

3. In a machine for manufacturing potato chips, said machine comprising, a frame having first and second ends and an upper portion, an elongated cooking oil container on said frame, a potato slicing means secured to the upper portion of a first end of said container, fluid flow means operatively connected to said cooking oil container to cause cooking oil to flow in said container from said first end toward a second end of said container, a potato chip discharge means mounted on said second end of said container, and heating means on said frame to heat oil in said container to cook potato slices deposited therein; the improvement comprising, pivotal means pivotally connecting said potato slicing means to the upper portion of one end of said frame so that said potato slicing means can be pivoted with respect to said container to permit cleaning thereof, said potato slicing means having a potato slice discharge means which is completely positioned over a portion of said container to insure that all potato slices discharged from said potato slicing means will fall directly into said container, heat transfer means comprising spaced-apart solid bars mounted on the exterior bottom of said container adjacent said heating means to enhance the uniform conduction of heat from said heating means to said container, and a potato washing means mounted on said frame adjacent said potato slicing means.

4. In a machine for manufacturing potato chips, said machine comprising, a frame having first and second ends and an upper end portion, an elongated cooking oil container on said frame, a potato slicing means secured to the upper portion of a first end of said container, fluid flow means operatively connected to said cooking oil container to cause cooking oil to flow in said container from said first end toward a second end of said container, a potato chip discharge means mounted on said second end of said container, and heating means on said frame to heat oil in said container to cook potato slices deposited therein; said discharge means comprising a conveyor, a plurality of flow retarder paddles extending transversely across said container, the improvement comprising, a single power means operatively connected to said conveyor and said retarder paddles to cause said retarder paddles to rotate and to cause said conveyor to discharge cooked potato slices from said container, pivotal means pivotally connecting said potato slicing means to the upper portion of one end of said frame so that said potato slicing means can be pivoted with respect to said container to permit cleaning thereof, said potato slicing means having a potato slice discharge means which is completely positioned over a portion of said container to insure that all potato slices discharged from said potato slicing means will fall directly into said container, heat transfer means comprising spaced-apart solid bars mounted on the exterior bottom of said container adjacent said heating means to enhance the uniform conduction of heat from said heating means to said container, and a potato washing means mounted on said frame adjacent said potato slicing means.

5. The device of claim 4 wherein said single power means includes a variable speed control means whereby the speed of the power output of said single power means can be variably controlled.

6. The device of claim 5 wherein said potato slicing means includes a variable speed control means.

7. The device of claim 4 wherein said retarder paddles comprise an elongated shaft, a plurality of paddle elements secured to said shaft and extending radially outwardly therefrom, said paddle elements comprising a first inner portion secured to said shaft, and an outer portion bent at an angle with respect to said first portion.

8. In a machine for manufacturing potato chips of claim 4 wherein an elongated heat shield is secured to said frame and extends downwardly from at least one side of said container to protect the operator of the machine from the heat of said heating means.

9. The device of claim 4 wherein said fluid flow means comprises a hydraulic circuit means connected to the ends of said container, a pump in said circuit, and an electrical heating element in said circuit means whereby said fluid flow means can cause flow of cooking oil from the first end of said container towards the second end of said container, and thence through said pump and said hydraulic circuit back to said first end of said container.

* * * * *